United States Patent [19]

Fock et al.

[11] 4,404,324

[45] Sep. 13, 1983

[54] CURABLE ADHESIVE

[75] Inventors: Jürgen Fock, Düsseldorf; Dietmar Schedlitzki, Essen, both of Fed. Rep. of Germany

[73] Assignee: Th. Goldschmidt AG, Essen, Fed. Rep. of Germany

[21] Appl. No.: 329,413

[22] Filed: Dec. 10, 1981

[30] Foreign Application Priority Data

Dec. 19, 1980 [DE] Fed. Rep. of Germany ....... 3047926

[51] Int. Cl.$^3$ .................. C08G 18/62; C08F 8/30; C08L 75/00
[52] U.S. Cl. ..................... 525/123; 525/127; 528/58; 528/53; 528/54; 528/73; 524/413; 524/430; 524/431; 524/433; 524/445; 524/447; 524/451; 528/75; 528/905
[58] Field of Search ............. 528/75, 904, 73; 525/123, 129

[56] References Cited

U.S. PATENT DOCUMENTS 4,234,468 11/1980 Dalibor .............................. 525/123
4,293,661 10/1981 Probst et al. ...................... 525/127

*Primary Examiner*—H. S. Cockaram
*Attorney, Agent, or Firm*—Toren, McGeady and Stanger

[57] ABSTRACT

The invention relates to a curable adhesive based on a reactive acrylate and/or methacrylate copolymer. The reaction principle, on which the curing of the adhesive is based, is the reaction of the hydroxyl groups of the ω-hydroxyalkyl esters of acrylic and/or methacrylic acids with the isocyanate groups of the polyisocyanates or their partial reaction products with polyols. The inventive adhesives can be used without solvents or with only a slight content of organic solvents. They adhere well to plastic and metal surfaces, even when exposed to the effects of water or water vapor. The best values for the drum peel strength are obtained from acrylic copolymers whose molecular weight falls in the range of 1,000 to 3,000.

8 Claims, 1 Drawing Figure

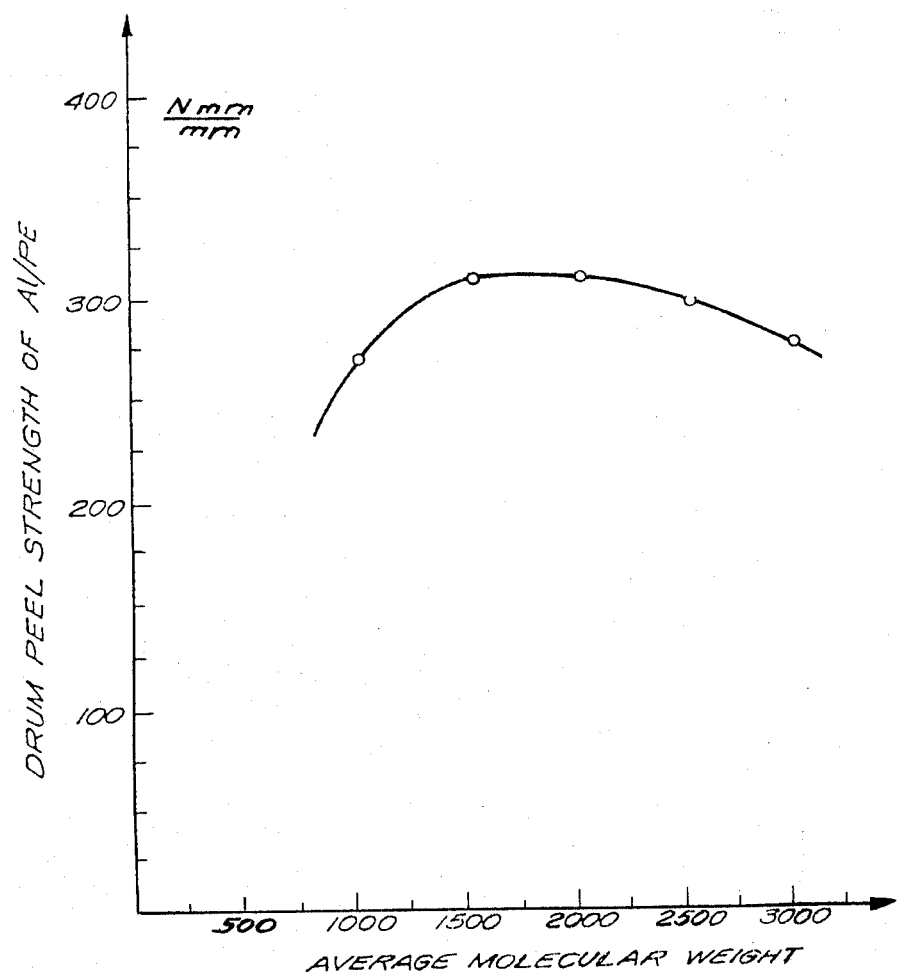

CURABLE ADHESIVE

BACKGROUND OF THE INVENTION

1. Field of the Invention

The invention relates to a curable adhesive based on a reactive acrylate and/or methacrylate copolymer.

2. Description of the Prior Art

German Pat. No. 2,524,197 discloses the use as an adhesive of a terpolymer, consisting of 20 to 45 weight percent of acrylonitrile and/or methacrylonitrile, 45 to 70 weight percent of an acrylate with 1 to 12 carbon atoms in the alkyl radical, and 1 to 10 weight percent of acrylic, methacrylic or itaconic acid, in which the sum of the monomers must amount to 100 weight percent and the copolymer obtained has a limiting viscosity of 0.1 to 0.8 (100 mL×g$^{-1}$) at 20° C. in chloroform. Optionally, the terpolymer may be in admixture with up to 35 weight percent of an epoxide resin or a glycidyl group-containing phenol-formaldehyde resin. This adhesive makes gluings of high shear strength and good peel strength possible. The adhesive may be used as a film for gluing metal surfaces together as well as for gluing plastic films to metal surfaces. The adhesives remain thermoplastic if they are free of epoxide resins or of glycidyl group-containing phenol-formaldehyde resins. In the presence of epoxide resins or of glycidyl group-containing phenol-formaldehyde resins in the adhesive, the adhesives are heat-curable at temperatures of about 130° C. Patent application (P No. 29 26 284.8-43) not yet published discloses a heat-curable adhesive containing:

(a) 20 to 80 weight percent of a copolymer which is obtained by the polymerization of ($a_1$) 20 to 45 weight percent of acrylonitrile and/or methacrylonitrile, ($a_2$) 35 to 65 weight percent of one or more alkyl esters of acrylic and/or methacrylic acid with 1 to 12 carbon atoms in the alkyl radical, ($a_3$) 10 to 20 weight percent of acrylic, methacrylic and/or itaconic acid, ($a_4$) 0 to 15 weight percent of acrylamide and/or methacrylamide, in which the sum of the monomers must amount to 100 weight percent and in which the copolymer has a limiting viscosity of 0.1 to 0.8 (100 mL×g$^{-1}$) at 20° C. in methyl acetate, (b) 10 to 70 weight percent of epoxide resin and/or glycidyl group-containing phenol-formaldehyde resin, (c) 0.2 to 15 weight percent of a harder for component (b), which is effective when heated, and (d) 0 to 5 weight percent of an accelerator for the reaction of component (b) with components (a) and (c), in which the sum of (a) to (d) must amount to 100 weight percent, with the optional addition of the usual additives, such as, gluing auxiliaries, adhesion promoters, pigments and fillers.

Compared to the adhesives of German Pat. No. 2,524,197, these adhesives cure at temperatures of 100° to 130° C. By curing at such low temperatures, it is possible to keep the thermal stress on the plastics to be glued at a low level and to maintain the surface quality and gloss of the plastic. The composite materials of plastic and metal, obtained by the gluing, can be shaped in the usual manner without adversely affecting the adhesion.

Patent application No. P 30 24 869.2 discloses a heat-curable adhesive containing (a) a copolymer, which is obtained by the polymerization of ($a_1$) 35 to 70 weight percent of one or more alkyl esters of acrylic and/or methacrylic acid with 1 to 8 carbon atoms in the alkyl radical, ($a_2$) 20 to 45 weight percent of acrylonitrile and/or methacrylonitrile, ($a_3$) 10 to 20 weight percent of one or more ω-hydroxyalkyl esters of acrylic and/or methacrylic acid with 1 to 5 carbon atoms in the alkyl radical, and ($a_4$) 0 to 15 weight percent of acrylamide and/or methacrylamide, in which the sum of the monomers ($a_1$) to ($a_4$) must add up to 100 weight percent and the copolymer has a limiting viscosity of 0.5 to 0.6 (100 mL×g$^{-1}$) at 25° C. in methyl acetate, and (b) one or more polyisocyanates and/or their partial conversion products with polyols, the molecule having to have at least 2 isocyanate groups on the average, the components (a) and (b) being present in such a ratio that 1 to 1.5 isocyanate groups of component (b) correspond to 1 hydroxyl group of component (a). Optional conventional additives, such as, accelerators, gluing auxiliaries, pigments and fillers may also be present.

Such an adhesive is advantageous since it can be cured reactively at low temperatures, for example, at 80° C. and lower, without disadvantageously affecting the adhesive properties of the cured adhesives, the resistance of the cured adhesives towards moisture and other weather resistant properties.

SUMMARY OF THE INVENTION

We have discovered a method for improving the properties of the adhesives having as low a viscosity as possible and requiring minimal amounts of solvents and/or diluents, such as, for example, toluene.

More particularly, we have discovered a curable adhesive composition which contains as the active components:

(a) a copolymer, obtained by the polymerization of ($a_1$) 25 to 64.8 weight percent of one or more alkyl esters of acrylic and/or methacrylic acid with 1 to 8 carbon atoms in the alkyl radical, ($a_2$) 20 to 40 weight percent of acrylonitrile and/or methacrylonitrile and/or vinyl acetate, ($a_3$) 15 to 35 weight percent of one or more ω-hydroxyalkyl esters of acrylic and/or methacrylic acid with 1 to 5 carbon atoms in the alkyl radical, ($a_4$) 0.2 to 5 weight percent of glycidyl acrylate and/or glycidyl methacrylate, and optionally ($a_5$) 0 to 35 weight percent of acrylic and/or vinyl monomers, whose composition differs from that of components ($a_1$) to ($a_4$), in the presence of mercapto group-containing controllers, which have at least one hydroxyl group in the molecule, the sum of the monomer ($a_1$) to ($a_5$) adding up to 100 weight percent and the copolymer having an average molecular weight of 800 to 2,500, and (b) one or more polyisocyanates and/or their partial reaction products with polyols, in which the molecule has, on the average, at least 2 isocyanate groups, components (a) and (b) being present in such a ratio that 1 to 1.3 isocyanate groups of component (b) correspond to one hydroxyl group of component (a). The composition may also contain the usual additives, such as, accelerators, gluing auxiliaries, pigments and fillers.

BRIEF DESCRIPTION OF THE DRAWING

The drawing is a graph of variations in peel strength with average molecular weight.

DESCRIPTION OF THE PREFERRED EMBODIMENT

The principal on which the curing of the adhesive is based, resides in the reaction of the hydroxyl groups of the ω-hydroxyalkyl ester of the acrylic and/or methacrylic acid (component ($a_3$)) with the isocyanate groups of the polyisocyanates or their partial reaction products with polyols (component (b)).

While the use of this reaction principle for curing purposes is known, in practice, the adhesion to plastic surfaces of the adhesive obtained is generally unsatisfactory, if polyetherols are used as the polyol component. Also, with adhesives baked on polyesterols, the adhesion to the metal surface does not durably withstand the effects of water or water vapor.

The adhesive, described in patent application P No. 30 24 869.2, does fulfill these requirements. However, it has the disadvantage that, in order to be used, it must contain 50 to 60 weight percent of an organic solvent in order to meet the needs of practical requirements.

In contrast, the inventive adhesives contain only slight amounts of organic solvents or are solvent-free while still maintaining all of the other desirable application properties, such as, for example, adhesion to plastic or metal surfaces even when acted upon by water or water vapor.

In this connection, it is particularly essential that copolymer (a) has a relatively low average molecular weight from 800 to 2,500, and preferably from 1,200 to 2,000. The molecular weight is measured by known methods using a vapor-pressure osmometer. This low molecular weight is attained by the fact that the polymerization of the monomers ($a_1$) to ($a_5$) is carried out in the presence of mercapto group-containing controllers, which additionally carry at least one hydroxyl group on the molecule. As mercapto group-containing controller, especially 2-mercaptoethanol and 1-thioglycerine have proven themselves.

The acrylic polymers, described in patent application P No. 30 24 869.2, have an average molecular weight of about 10,000 and higher (measured by gel permeation chromatography). Below this value, the adhesion strength values fall off again. It was therefore surprising that comparably high adhesive strength values were observed with the inventive acrylic polymers, especially in the very low molecular weight range of 1,200 to 2,000.

Moreover, it was surprising that the relatively large amounts of mercapto group-containing controllers, which are required for adjusting to the low molecular weights and are incorporated chemically into the acrylic polymers, do not have a disadvantageous effect on the adhesive properties of the adhesives.

The polymerization of copolymer (a) is accomplished by methods known to those skilled in the art. The polymerization can be carried out as an emulsion polymerization or as a solution polymerization. The polymerization in small amounts of a solvent is preferred because, in the case of an emulsion polymerization, careful drying of the products is required because of the reaction with isocyanates.

Examples of suitable monomers ($a_1$) are ethyl acrylate, butyl acrylate, butyl methacrylate, methyl acrylate, methyl methacrylate, 2-ethylhexyl acrylate or 2-ethylhexyl methacrylate.

The components ($a_2$) are formed by acrylonitrile, methacrylonitrile or vinyl acetate or mixtures thereof. The nitrile group-containing monomers bring about the good adhesion of the inventive adhesives to different plastic and metal surfaces. A similar effect is ascribed to the vinyl acetate, which is incorporated into the polymeric molecule. Vinyl acetate-containing copolymers have the additional advantage of a lower viscosity, so that the use of an optional reactive solvent or heating of the adhesive to reduce the viscosity becomes unnecessary.

From the literature (for example, B. Vollmert, Grundriss der makromolekularen Chemie (Outline of Macromolecular Chemistry), Volume 1, Karlsruhe, 1979) it is known that the copolymerization parameters for vinyl acetate and acrylate or methacrylate monomers are not very favorable. Inter alia, this results in the fact that the copolymers formed have a chemical composition which deviates considerably from the monomer mixture used which is undesirable for various reasons.

It may be inferred from German Offenlegungsschrift No. 2,822,436 that because of unfavorable copolymerization parameters, instead of using ω-hydroxyalkyl acrylates or methacrylates, it is better to use a hydroxyl group-containing allyl ester of the general formula

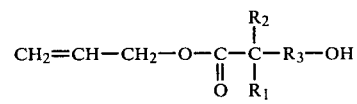

because these ensure more readily a uniform incorporation in the copolymer. It was therefore particularly surprising that hydroxyl group-containing copolymers, which have valuable adhesive properties, can be prepared with the inventive monomer composition in the molecular weight range indicated.

Examples of suitable monomers ($a_3$) are 2-hydroxyethyl acrylate or methacrylate, 3-hydroxypropyl acrylate or methacrylate, 2-hydroxypropyl acrylate or methacrylate, 1,4-butanediol monoacrylate or monomethacrylate.

In addition, the monomer mixture may contain from 0 to 35 weight percent of different acrylic and/or vinyl monomers. Examples of such monomers are: vinyl propionate, styrene, acrylamide or methacrylamide.

It is advantageous to dissolve the copolymer (a) in at least difunctional alcohol; the amount used should not, however, exceed 30 weight percent of the components (a). Examples of such solvents are the particularly preferred polyalkyleneglycols, such as, for example, polyethyleneglycols with a molecular weight of 200 to 400.

As the polyisocyanate, a polyisocyanate of the general formula

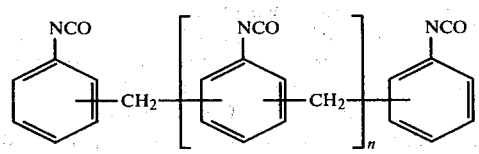

-continued in which n ≦ 3,
or

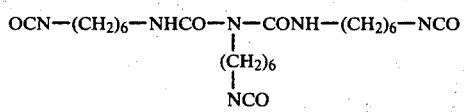
OCN—(CH$_2$)$_6$—NHCO—N—CONH—(CH$_2$)$_6$—NCO
                    |
                   (CH$_2$)$_6$
                    |
                   NCO or

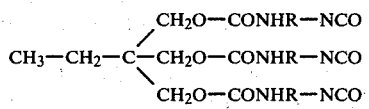
$$CH_3-CH_2-C\begin{matrix}CH_2O-CONHR-NCO\\CH_2O-CONHR-NCO\\CH_2O-CONHR-NCO\end{matrix}$$

in which R represents the radical 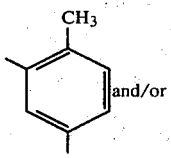 and/or 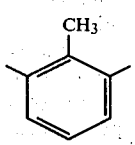

is preferably used. These isocyanates are commercially available. However, other polyisocyanates, such as, for example, 1,6-hexamethylenediisocyanate; 2,4,4-trimethyl-1,6-hexamethylenediisocyanate; 3-isocyanatomethyl-3,5,5-trimethylcyclohexylisocyanate; 1,4-tetramethylenediisocyanate; 2,4- and 2,6-hexahydrotoluylenediisocyanate; hexahydro-1,3 or -1,4-phenylenediisocyanate; 1,3- and 1,4-phenylenediisocyanate; 2,4- and 2,6-toluylenediisocyanate; 4,4'-diisocyanato-diphenylmethane; naphthylene-1,5-diisocyanate; m-xylylene-diisocyanate; tris-(4-isocyanatophenyl)-thiophosphate; 4,4',4''-triisocyanato-triphenylmethane; 2,4,6-triisocyanato-toluene or 2,4,4'-triisocyanato-diphenylether are also suitable. The isocyanates must however fulfill the requirement that they have, on the average, at least two isocyanate groups per molecule.

Instead of the pure polyisocyanates, their partial reaction products with polyether- or polyesterpolyols can also be used. In this connection, an adhesive is preferred in which the component (b) is a partial reaction product of one or more polyisocyanates with polyether- or polyesterpolyols of a molecular weight of less than 2,000, the polyether- or polyesterpolyols having, on the average, at least 2 hydroxyl groups per molecule and the polyisocyanates having been reacted with the polyols in such a ratio, that 1.5 to 3 isocyanate groups corresponded to 1 hydroxyl group.

Examples of suitable polyetherols are linear or branched polyetherols based on ethylene oxide, propylene oxide and butylene oxide, polythioethers and adducts of ethylene oxide on polyamines and alkoxylated phosphoric acids.

Examples of suitable polyesterols are linear or branched polyesterols, such as, those obtained in the usual manner from multifunctional, preferably difunctional carboxylic acids, such as, adipic acid, sebacic acid, phthalic acid, halogenated phthalic acids, maleic acid, 1,2,4-benzenetricarboxylic acid, monomeric, dimeric or trimeric fatty acids and multifunctional alcohols, such as, for example, ethylene glycol, polyethyleneglycol, propylene glycol, polypropyleneglycol, 1,3- and 1,4-butanediol 2,2-dimethyl-1,3-propanediol, 1,6-hexanediol, 1,1,1,-trimethylolpropane, hexanetriols or glycerine.

The reaction of the polyisocyanates with the polyether- or polyesterpolyols is carried out in a ratio such that the reaction product has, on the average, at least 2 isocyanate groups per molecule.

If the inventive adhesive contains at least difunctional alcohols as a solvent for the copolymer (a), these alcohols react with the isocyanates of component (b) and, by so doing, are incorporated into the structure of the adhesive.

The curing time or the curing temperature of the adhesive can be shortened or lowered by known methods, essentially by the addition of an accelerator. Especially preferred is therefore an adhesive which contains as the accelerator, up to 2 weight percent, based on the sum of the components (a) and (b), of a tertiary amine and/or an organic tin compound. As the tertiary amine, especially dimethylbenzylamine, dicyclohexylmethylamine, dimethylpiperazine, dimethylaminoethanol, 1,2-dimethylimidazole, N-methyl- or N-ethyl-morpholine, dimethylcyclohexylamine, 1-aza-bicyclo-(3,3,0)-octane or 1,4-diazabicyclo-(2,2,2)-octane are suitable. Examples of readily usable organic tin compounds are dibutyl tin dilaurate or tin(II) octoate.

The inventive adhesive may contain additional auxiliaries. Examples of such auxiliaries are gluing auxiliaries, such as, for example, polychloroprene, acrylonitrile/butadiene copolymers, polyamides or polyurethanes. These gluing auxiliaries are preferably added in amounts up to 15 weight percent, based on 100 weight percent of components (a) and (b).

Other auxiliaries, e.g., pigments and/or fillers may also be added to the adhesive. For this purpose, inorganic as well as organic products, such as, for example, titanium dioxide, iron oxide, chromium oxide, barium sulfate, powdered quartz, talc or bentonite are suitable.

The invention is explained further by means of the following examples. They show the preparation of the inventive adhesive as well as the adhesive properties.

Preparation of the Inventive Adhesives

1. Raw Materials
1.1. Acrylic polymer (a)

For the preparation of the acrylic polymer (a) in solution, 120 g of toluene are refluxed; 400 g of the monomer mixture (a$_1$) to (a$_5$), containing 0.1 to 0.5 weight percent of azobisisobutyronitrile and the mercapto group-containing controller, is then added dropwise during one hour, the refluxing of the toluene being continued. Heating is continued for a further three hours under reflux and the small amounts of unreacted residual monomers, together with the toluene, are removed under vacuum. Before cooling, the acrylic polymer is mixed either with organic solvents which do not react with isocyanate groups, such as, for example, acetone, methyl ethyl ketone, ethyl acetate, isopropyl acetate or toluene, or at least difunctional alcohols, such as, for example, polyethyleneglycols or polypropyleneglycols. It is however also possible to work completely without solvents or alcohols. In such a case, it is, if necessary, advisable to heat the acrylic polymer before use to 30° to 60° C., should the viscosity be too high at room temperature.

The chemical composition of the individual acrylic polymers, the nature and amount of the mercapto group-containing controllers and the average molecular weight, measured in a vapor-pressure osmometer, are given in Table 1, which also contains the amounts of alcohols or organic solvents used.

1.2. Polyisocyanates

As polyisocyanates, four conventional commercial products are used: designated in $b_1$ is a polyphenyl-polymethylene-polyisocyanate (crude MDI) of the formula

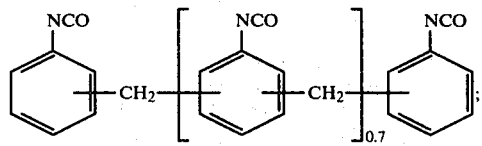

designated $b_2$ is a triisocyanate of the formula

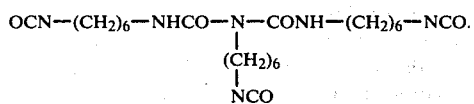

Both polyisocyanates are used in the solvent-free from.

Designated $b_3$ is a polyisocyanate of the formula

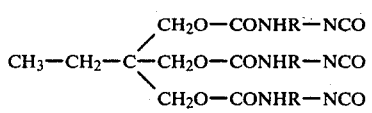

in which R represents the radical

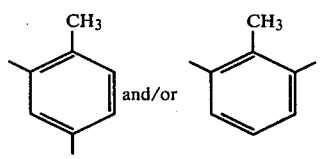

which is available in the form of a 75 weight percent solution in ethyl acetate.

In addition, a 60 weight percent solution in methyl ethyl ketone of a reaction product of 3 moles of 2,4-toluylenediisocyanate and 1 mole of a trifunctional polyesterol with a molecular weight of 600, obtained from adipic acid, ethylene glycol, 2,2-dimethyl-1,3-propanediol and trimethylolpropane designated $b_4$ is used.

The free isocyanate-group content of each of the polyisocyanates used, based on the solids, is:
31.2 weight percent for polyisocyanate $b_1$
22.7 weight percent for polyisocyanate $b_2$
13.0 weight percent for polyisocyanate $b_3$
11.2 weight percent for polyisocyanate $b_4$.

2. Preparation of the Adhesive

For the preparation of the inventive adhesive solutions, the polyisocyanates are mixed intensively with the acrylic polymers. If necessary, nonaqueous solvents, such as, those listed under 1.1., can be added in order to adjust the viscosity to the desired value. Further additives, such as, accelerators, gluing auxiliaries, pigments and fillers, can be dissolved or dispersed, and are advisably added to the acrylic polymer, before the latter is admixed with the polyisocyanate.

The exact formulations of the adhesives are given in Table 1. The formulations No. 1 to 11 describe the inventive adhesive. These are followed by formulations No. 12 to 16, which are the comparison adhesives. Formulations No. 12 and 13 contain adhesives of German Auslegeschrift No. 2,524,197 and patent application P No. 2,926,284.8-43, in which a carboxyl group-containing acrylic copolymer is cured with epoxide resin. The epoxide resin is based on bisphenol A/epichlorohydrin and has an epoxide equivalent of 180 g/gram equivalent.

Instead of the acrylic copolymer, the comparison adhesive No. 14 contains a difunctional polyetherol based on propylene and ethylene oxides with a hydroxyl number of 90 mg KOH/g.

Instead of the acrylic copolymer, the comparison adhesive No. 15 contains a polyesterol with a functionality of ca. 2.5 and a hydroxyl number of 109 mg KOH/g. The polyester is obtained by the condensation of adipic acid with diethylene glycol, ethylene glycol and trimethylolpropane.

Formulation No. 16 contains an adhesive of the patent application Ser. No. P 30 24 869.2, in which a hydroxyl group-containing acrylic polymer, with an average molecular weight of 19.000 is used. This acrylic polymer must be dissolved in a considerable amount of a solvent, for example, acetone, so that it can be used.

Gluing and Testing the Application of the Adhesives

In order to test the application of the adhesives, two strength tests are used:
(a) drum peel strength according to DIN 53 295
(b) angle peel strength according to DIN 53 282.

The drum peel strength is determined on three different composites:
aluminum/polyethylene (PE) composite
aluminum/epoxide resin/glass fiber laminate (GFK) composite
aluminum/ABS composite.

The aluminum sheet metal is of Al Cu Mg 2pl quality and, before being glued, is degreased and subjected to a chromate/sulfuric acid pickling process. The polyethylene is roughened and pretreated, and the epoxide resin/glass fiber laminate (GFK) is abraded.

The adhesives are applied in an amount of 60 g/m² of solids on the adherend and the solvents, insofar as they are present, are evaporated at room temperature or at an elevated temperature, for example, at 70° C. The adhesive is cured for 20 minutes at a temperature of 90° C. and under a pressure of 0.5 N/mm². After cooling, the peeling test is carried out at 20 C.

The angle peel strength is carried out on test pieces of roughened, pretreated polyethylene, 1.0 mm thick. The application of the adhesive, the evaporation of the solvent and the curing are carried out as described above.

The angle peel strength is conducted at 20° C. In addition, further test pieces are kept in hot water at 95° C. for three days. Before the peeling test, the test pieces are cooled in water at 20° C. and peeled while still wet. This storage in hot water is well suited as a short-term test for evaluating the resistance of the adhesive to water and moisture.

The strength values obtained are given in Table 2. It is evident from the values that the comparison adhesives No. 12 and 13 provide considerably lesser strength values than the inventive adhesives No. 1 to 11. The comparison adhesives of formulation No. 14 adhere very poorly to plastic surfaces. Although the comparison adhesives of formulation No. 15 adhere better to plastic surfaces, their strength decreases greatly after storage in water.

The comparison adhesives of formulation No. 16 do adhere well to polyethylene and to the epoxide/glass fiber laminate and they are water-resistant. However, for the formulation and processing of such adhesives, considerable amounts of organic solvents are required. They are surpassed by the inventive adhesives in regard to the strength of the bond with ABS.

Drum Peel Strength as a Function of the Average Molecular Weight of Copolymer (a)

Acrylic copolymers of different average molecular weight are used in the adhesive formulation No. 1. The drawing shows the drum peel strength of the aluminum/polyethylene composite as a function of the average molecular weight of the acrylic copolymer (a). It is evident that particularly high strengths are obtained above a molecular weight of 1,200. At molecular weights greater than 2,000, the strengths decline gradually. At the same time, the viscosity of the acrylic copolymer (a) increases and, at the same time, the amount of solvent required also increases considerably.

TABLE 1

| | | Adhesive Formulations | | | | | | |
|---|---|---|---|---|---|---|---|---|
| | | Acrylic polymer[a] | | | Polyisocyanate[b] | | | Other |
| Formulation No. | Monomer Mixture | Controller Weight % | Average Molecular Weight | Parts by Weight | Parts by Weight | Molar Ratio OH:NCO | Solvent Parts by Weight | Additives Parts by Weight |
| 1 | I | 4.0 2-Mercapto-ethanol | 1700 | 100 | 65.5 $b_1$ | 1:1.2 | — | 15 polyethylene glycol molecular weight 200 |
| 2 | II | 4.8 2-Mercapto-ethanol | 1550 | 100 | 41.7 $b_1$ | 1:1.2 | 10 acetone | — |
| 3 | III | 4.0 2-Mercapto-ethanol | 1650 | 100 | 38.7 $b_1$ | 1:1.15 | 18 acetone | — |
| 4 | IV | 4.0 2-Mercapto-ethanol | 1650 | 100 | 38.7 $b_1$ | 1:1.15 | — | — |
| 5 | V | 4.8 2-Mercapto-ethanol | 1500 | 100 | 41.7 $b_1$ | 1:1.2 | — | — |
| 6 | VI | 4.8 1-Thio-glycerine | 1640 | 100 | 46.9 $b_1$ | 1:1.2 | — | 15 polypropyleneglycol molecular weight 200 |
| 7 | VII | 4.0 2-Mercapto-ethanol | 1750 | 100 | 39.0 $b_1$ | 1:1.2 | 10 acetone | — |
| 8 | I | 4.0 2-Mercapto-ethanol | 1700 | 100 | 56.8 $b_2$ | 1:1.2 | 10 acetone | 0,1 1,4-diazabicyclo-(2,2,2)-octane |
| 9 | III | 4.0 2-Mercapto-ethanol | 1650 | 100 | 84.3 $b_3$ | 1:1.05 | — | — |
| 10 | III | 4.0 2-Mercapto-ethanol | 1650 | 100 | 97.8 $b_4$ | 1:1.05 | — | — |
| 11 | II | 4.8 2-Mercapto-ethanol | 1550 | 100 | 41.7 $b_1$ | 1:1.2 | 15 acetone | 20 titanium dioxide |
| | | | Comparison adhesive | | | | | |
| 12 | VIII | 0.2 n-dodecanethiol | 70000[2] | 80 | — | — | 150 acetone | 20 epoxide resin |
| 13 | IX | 0.5 n-dodecanethiol | 40000[2] | 71 | — | — | 100 acetone | 25,4 epoxide resin 3,6 pyromellitic dianhydride |
| 14 | X | — | — | 100 | 25.9 $b_1$ | 1:1.2 | — | — |
| 15 | XI | — | — | 100 | 31.4 $b_1$ | 1:1.2 | — | — |
| 16 | XII | 0.65 n-dodecanethiol | 19000[2] | 100 | 18.1 $b_1$ | 1:1.2 | 80 acetone | — |

[1]Addition based on 100 parts by weight of monomer mixture.
[2]Determined by gel chromatography Explanations for Table 1
Composition of
Monomer Mixture I:  45.5 weight percent butyl acrylate $a_1$
  28.0 weight percent acrylonitrile $a_2$
  25.0 weight percent 2-hydroxyethyl acrylate $a_3$
  1.5 weight percent glycidyl methacrylate $a_4$ II:  48.0 weight percent butyl acrylate $a_1$
  23.0 weight percent acrylonitrile $a_2$
  27.0 weight percent 2-hydroxypropyl acrylate $a_3$
  2.0 weight percent glycidyl methacrylate $a_4$ III:  50.5 weight percent methyl methacrylate $a_1$
  24.0 weight percent acrylonitrile $a_2$
  24.0 weight percent 2-hydroxyethyl acrylate $a_3$
  1.5 weight percent glycidyl meth-

TABLE 1-continued

Adhesive Formulations

| Formulation No. | Monomer Mixture | Acrylic polymer[a] Controller Weight % | Average Molecular Weight | Parts by Weight | Polyisocyanate[b] Parts by Weight | Molar Ratio OH:NCO | Solvent Parts by Weight | Other Additives Parts by Weight |
|---|---|---|---|---|---|---|---|---|
| | | acrylate a₄ | | | | | | |
| | IV: | 43.0 weight percent butyl acrylate a₁ | | | | | | |
| | | 32.0 weight percent vinyl acetate a₂ | | | | | | |
| | | 24.0 weight percent 2-hydroxyethyl acrylate a₃ | | | | | | |
| | | 1.0 weight percent glycidyl methacrylate a₄ | | | | | | |
| | V: | 15.5 weight percent ethyl acrylate a₁ | | | | | | |
| | | 26.5 weight percent ethylhexyl acrylate a₁ | | | | | | |
| | | 30.0 weight percent vinyl acetate a₂ | | | | | | |
| | | 27.0 weight percent 2-hydroxypropyl acrylate a₃ | | | | | | |
| | | 1.0 weight percent glycidyl methacrylate a₄ | | | | | | |
| | VI: | 15.0 weight percent ethyl acrylate a₁ | | | | | | |
| | | 31.5 weight percent butyl acrylate a₁ | | | | | | |
| | | 27.0 weight percent acrylonitrile a₂ | | | | | | |
| | | 25.0 weight percent 2-hydroxyethyl acrylate a₃ | | | | | | |
| | | 1.5 weight percent glycidyl methacrylate a₄ | | | | | | |
| | VII: | 42.0 weight percent butyl acrylate a₁ | | | | | | |
| | | 26.0 weight percent acrylonitrile a₂ | | | | | | |
| | | 23.0 weight percent 2-hydroxyethyl acrylate a₃ | | | | | | |
| | | 2.0 weight percent glycidyl methacrylate a₄ | | | | | | |
| | | 7.0 weight percent styrene a₅ | | | | | | |
| | VIII: | 60.9 weight percent ethyl acrylate | | | | | | |
| | | 35.4 weight percent acrylonitrile | | | | | | |
| | | 3.7 weight percent acrylic acid (according to German Patent 2,524,197) | | | | | | |
| | IX: | 52.0 weight percent ethyl acrylate | | | | | | |
| | | 33.0 weight percent acrylonitrile | | | | | | |
| | | 15.0 weight percent acrylic acid (according to Patent Application P 29 26 284.8-43) | | | | | | |
| | X: | polyetherol | | | | | | |
| | XI: | polyesterol | | | | | | |
| | XII: | 54.0 weight percent ethyl acrylate | | | | | | |
| | | 31.4 weight percent acrylonitrile | | | | | | |
| | | 14.6 weight percent 2-hydroxyethyl methacrylate (according to Patent Application P 30 24 869.2) | | | | | | |

TABLE 2

Testing the Application of the Adhesives

| | Drum Peel Strength DIN 53 295 Nmm/mm | | | Angle Peel Strength DIN 53 282 N/mm | |
|---|---|---|---|---|---|
| | Al/PE | Al/GFK | Al/ABS | Without Stress | After Immersion for 3 days in hot water |
| Adhesive Formulation No. | | | | | |
| 1 | 340 | 95 | 205 | 4.0 | 3.6 |
| 2 | 330 | 85 | 215 | 3.8 | 3.4 |
| 3 | 335 | 80 | 220 | 3.7 | 3.5 |
| 4 | 340 | 88 | 230 | 3.9 | 3.0 |
| 5 | 321 | 81 | 207 | 3.8 | 2.9 |
| 6 | 315 | 84 | 209 | 3.4 | 3.0 |
| 7 | 320 | 79 | 204 | 3.9 | 3.6 |
| 8 | 300 | 69 | 180 | 3.5 | 3.1 |
| 9 | 290 | 60 | 170 | 3.4 | 3.1 |
| 10 | 280 | 64 | 155 | 3.3 | 3.0 |
| 11 | 330 | 84 | 208 | 4.2 | 3.8 |
| Comparison adhesive | | | | | |
| 12 | 45 | 20 | 27 | 1.2 | 1.0 |
| 13 | 70 | 28 | 39 | 1.4 | 1.2 |
| 14 | 5 | 3 | 5 | 0.1 | 0.07 |
| 15 | 145 | 39 | 48 | 3.0 | 0.73 |

TABLE 2-continued

| | Testing the Application of the Adhesives | | | | |
|---|---|---|---|---|---|
| | Drum Peel Strength DIN 53 295 | | | Angle Peel Strength DIN 53 282 N/mm | |
| | Nmm/mm | | | Without | After Immersion for |
| | Al/PE | Al/GFK | Al/ABS | Stress | 3 days in hot water |
| 16 | 315 | 65 | 85 | 4.8 | 4.5 |

We claim:

1. A curable adhesive comprising as the active components:
   (a) a copolymer obtained by the polymerization of:
   ($a_1$) 25 to 64.8 weight percent of one or more alkyl esters of acrylic or methacrylic acid having 1 to 8 carbon atoms in the alkyl radical,
   ($a_2$) 20 to 40 weight percent of acrylonitrile, methacrylonitrile or vinyl acetate,
   ($a_3$) 15 to 35 weight percent of one or more ω-hydroxyalkyl esters of acrylic or methacrylic acid having 1 to 5 carbon atoms in the alkyl radical,
   ($a_4$) 0.2 to 5 weight percent of glycidyl acrylate or glycidyl methacrylate, and
   ($a_5$) 0 to 35 weight percent of monomers selected from the group consisting of vinyl propionate, styrene, acrylamide, and methacrylamide in the presence of mercapto group-containing controllers, which have at least one hydroxyl group in the molecule, the sum of the monomers ($a_1$) to ($a_4$) adding up to 100 weight percent and the copolymer having an average molecular weight of 800 to 2,500, and
   (b) one or more polyisocyanates or their partial reaction products with polyols, in which the molecule possesses on the average, at least 2 isocyanate groups,
the components (a) and (b) being present in such a ratio that 1 to 1.3 isocyanate groups of component (b) correspond to one hydroxyl group of component (a).

2. The adhesive of claim 1 wherein copolymer (a) has an average molecular weight of 1,200 to 2,000.

3. The adhesive of claim 1 or 2 wherein copolymer (a) is obtained by polymerization in the presence of 2-mercaptoethanol or 1-thioglycerine.

4. The adhesive of claim 1 or 2 wherein copolymer (a) is dissolved in at most, 30 weight percent of an alcohol which is at least difunctional.

5. The adhesive of claim 4 wherein polyalkyleneglycols with a molecular weight of 200 to 400 are used as solvents.

6. The adhesive of claim 1 or 2 wherein component (b) is a polyisocyanate having the general formula

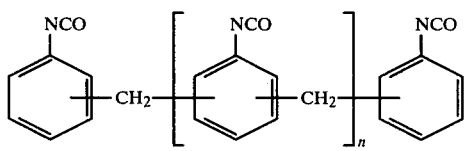

in which n ≦ 3,

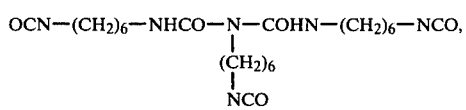

or

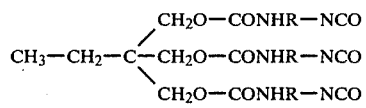

in which R represents the radical 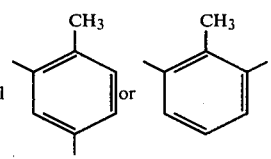.

7. The adhesive of claim 1 or 2 wherein component (b) is a partial reaction product of one or more polyisocyanates with a polyether- or polyester-polyols, the polyol having a molecular weight less than 2,000, the polyether- or polyester-polyols having at least 2 hydroxyl groups in the average molecule and the polyisocyanates being reacted with the polyols in such a ratio that 1.5 to 3 isocyanate groups correspond to one hydroxyl group.

8. The adhesive of claim 1 or 2 which contains as an accelerator, up to 2 weight percent, based on the sum of the components (a) and (b), of a tertiary amine or an organic tin compound.

* * * * *